United States Patent
Nishimura et al.

(10) Patent No.: US 7,154,539 B1
(45) Date of Patent: Dec. 26, 2006

(54) IMAGE PICKUP DEVICE FOR STILL AND MOTION IMAGES

(75) Inventors: Ryuji Nishimura, Yokohama (JP); Toshirou Kinugasa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/451,915

(22) Filed: Dec. 1, 1999

(30) Foreign Application Priority Data

Dec. 2, 1998 (JP) ............................... P10-343353

(51) Int. Cl.
*H04N 5/225* (2006.01)
*H04N 5/335* (2006.01)

(52) U.S. Cl. ................... 348/220.1; 348/317; 348/312

(58) Field of Classification Search ............ 348/220.1, 348/312, 311, 314, 322, 324, 222.1, 317, 348/320
See application file for complete search history.

(56) References Cited

U.S. PATENT DOCUMENTS

| | | | |
|---|---|---|---|
| 5,170,249 A | | 12/1992 | Ohtsubo et al. |
| 5,343,243 A | | 8/1994 | Maeda |
| 5,502,483 A | | 3/1996 | Takase et al. |
| 5,668,597 A | * | 9/1997 | Parulski et al. ............. 348/350 |
| 5,734,427 A | * | 3/1998 | Hayashi ................. 348/333.11 |
| 5,786,852 A | * | 7/1998 | Suzuki et al. ............... 348/312 |
| 5,986,698 A | * | 11/1999 | Nobuoka ................. 348/208.3 |
| 6,148,031 A | * | 11/2000 | Kato ....................... 375/240.13 |
| 6,614,477 B1 | * | 9/2003 | Lee et al. ................... 348/312 |
| 2003/0122941 A1 | * | 7/2003 | Okayama et al. ........ 348/231.2 |

FOREIGN PATENT DOCUMENTS

| JP | 04-151994 | 5/1992 |
|---|---|---|
| JP | 08-221562 | 8/1996 |
| JP | 09-168158 | 6/1997 |
| JP | 10-126694 | 5/1998 |

OTHER PUBLICATIONS

Japan Photograph Institute Fine Image Symposium, 1995, "Development of Compact Digital Camera", pp. 59-62.

* cited by examiner

*Primary Examiner*—Lin Ye
(74) *Attorney, Agent, or Firm*—Mattingly,Stanger,Malur & Brundidge, P.C.

(57) ABSTRACT

A photoelectric sensor outputs a signal by a first signal read mode and a second signal read mode. In the first signal read mode, the sensor outputs the pixel signals accumulated in the plural while subsampling the pixel signals for every one line. In the second signal read mode, the sensor outputs sequentially the pixel signals accumulated in two the plural pixels while adding the pixel signals from two pixels adjoining each other. An interlace/non-interlace converter converts the signal output by the photoelectric sensor in the first signal read mode to a non-interlaced signal. A signal processor generates a first video signal by converting the signal converted by the interlace/non-interlace converter into a specified image format in the first signal read mode, and generates a second video signal by converting the signal output by photoelectric sensor into the specified image format, such as a 4:2:2 YUV signal. A rate converter converts the number of output images per a unit time of the second video signal into another number. An encoder generates a first image data or a second image data by compressing the first or second video signals output from the signal processor according to an encoding method such as JPEG. A memory device memorizes the first or second image data output from the encoder. A decoder reproduce the first video signal by decoding the first image data memorized in the memory device.

18 Claims, 2 Drawing Sheets

IMAGE PICKUP DEVICE FOR STILL AND MOTION IMAGES

BACKGROUND OF THE INVENTION

The present invention relates to image pickup devices using image sensors such as CCDs (Charge Coupled Devices) and, more specially, to the image pickup devices that obtain both of still and motion images.

Conventional image pickup devices, which process photoelectricity conversion by image sensors such as CCDs and create digital picture signals having a specified format by digital signal processing, can be classified to video cameras picking up motion images and digital still cameras picking up still images. Cameras being able to pick up both of still and motion images are also proposed. Such cameras are disclosed in U.S. Pat. No. 5,170,249 and Japan Photograph Institute Fine Image Symposium 1995, pp. 59–62, "Development of Compact Digital Camera" for example.

In the above prior art, the image sensors generally are for motion images, that is, CCDs for the video cameras. The example of the color filter array used for such image sensors is shown to FIG. 3A. In this example, the complementary color filter of MG (magenta), G (green), CY (cyan) and YE (yellow) are used.

The signal of two pixels that adjoin in the vertical direction are mixed and outputted in case of generating a motion image data by using an image sensor with these color filters.

And, the video signals in the analog TV (television) signal standards such as the NTSC system are interlace signals. In such systems, quasi interlace scanning, which changes combinations of lines to be mixed for generating the interlace signals, are done.

Also, In case of taking a still image picture with this image sensor, the signals of pixels that adjoin in the vertical direction are not mixed, and the signals of each pixel are read independently. In this case, the pixel signals of odd number lines are read on the first field, the pixel signals of even number lines are read on the first field, and the still image are generated by sequentially converting the signals of the first field and the second field.

On the other hand, the image sensors that have large number of pixels than those of conventional video cameras are proposed for higher resolution of the still images. The numbers of the pixels in the vertical direction of these image sensors are larger than the number of scanning lines of the present television system. For example, in case the number of the effective pixels in the vertical direction is 960, it becomes the double of the number of the scanning lines in the television system. The example of the color filter arrangement of this image sensor for a still image is shown in FIG. 3C. In this filter, the RGB of the three elementary colors are used.

But there is a problem that when the number of pixels of a CCD is increased for the higher resolution, the formation of a motion image becomes difficult.

For example, in case using the CCD that has 250,000 pixels comprising 500 pixels in the vertical direction and 500 pixels in the horizontal direction, the CCD can output 30 flame images per second by the driving frequency of about 10 MHz, and a motion image such as by the NTSC system are made at real time. However, when the number of pixels in the horizontal and the vertical directions on the CCD becomes double for the higher resolution, the total number of the pixels of the CCD becomes 4 times. For example, in case that the number of the pixels in the vertical direction of CCD is 960, it is necessary to output the signals of 240 lines per one field by extracting one pixel from four pixels. Such process causes aliasings and deteriorates images.

SUMMARY OF THE INVENTION

The object of the present invention is therefore to provide an image pickup device that dissolved this problem and generate higher quality motion and still images with the high resolution CCD.

The present invention has the following constitution to achieve the object.

1. A photoelectric sensor outputs a signal by a first signal read mode and a second signal read mode. In the first signal read mode, the sensor outputs the pixel signals accumulated in the plural while subsampling the pixel signals for every one line. In the second signal read mode, the sensor outputs sequentially the pixel signals accumulated in two the plural pixels while adding the pixel signals from two pixels adjoining each other in the vertical direction.
2. An interlace/non-interlace converter converts the interlaced signal output by the photoelectric sensor in the first signal read mode to a non-interlaced (progressive) signal.
3. A signal processor generates a first video signal by converting the signal converted by the interlace/non-interlace converter into a specified image format in the first signal read mode, and generates a second video signal by converting the signal output by photoelectric sensor into the specified image format, such as a 4:2:2 YUV signal.
4. A frame rate converter converts the number of output images per a unit time of the second video signal into another number.
5. An encoder generates a first image data or a second image data by compressing the first or second video signals output from the signal processor according to an encoding method such as JPEG.
6. A memory device memorizes the first or second image data output from the encoder.
7. A decoder reproduce the first video signal by decoding the first image data memorized in the memory device.

Also, in the present invention, the high-resolution still image is generated by using the signal read out independently from each pixel of the photoelectric sensor in the first signal read mode.

For generating the motion image, the signals of all pixels are read with the half lines number of lines by adding the pixel signals from two pixels adjoining each other in the second signal read mode. At this time, read-out rate per one picture is double compared with the case of subsampling one line from four lines the pixel signals for every one line for example. In case the number of effective pixels of a vertical direction is 960 for example, the signal of 480 lines are read at the rate of one picture per 1/30 seconds because the pixel signals from two pixels adjoining each other are read out by adding each other when motion images are took. This signal is converted into the interlace signal of 240 lines per 1/60 seconds by the rate converter. A high quality motion image picture without the aliasings back is generated because the motion image does not need to be subsampled in the verticality direction.

According to the present invention, high-resolution still and motion images are generated in the image pickup device having functions of taking motion images and still images because all pixel signals are read out and the motion image are generated without the subsampling by mixing the pixel signals when taking the motion image.

BRIEF DESCRIPTION OF THE DRAWING

These and other features, objects and advantages of the present invention will become more apparent from the following description when taken in conjunction with the accompanying drawings wherein.

DETAILED DESCRIPTION OF PREFERRED EMBODIMENTS

Figure 1:
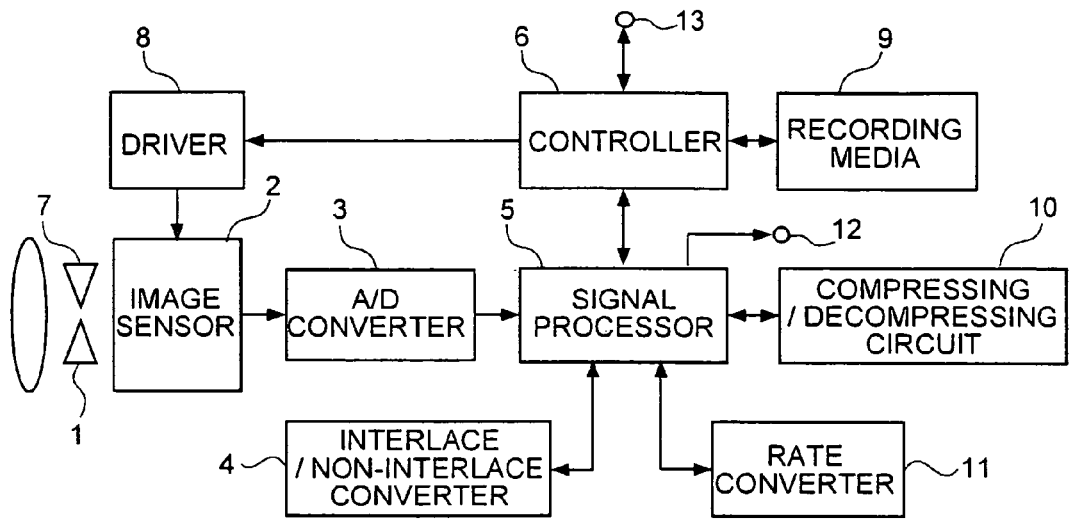
FIG. 1 shows a block diagram of an example of the constitution of an image pickup device according to the present invention.

FIG. 1 shows the block diagram of the image pickup device according to the present invention. As shown in FIG. 1, light injected from a lens 1 and an iris 7 is focused on the pickup face of an image sensor 2 and forms an object image. A driver 8 drives the image sensor 2 under control of a controller 6.

Figure 2:
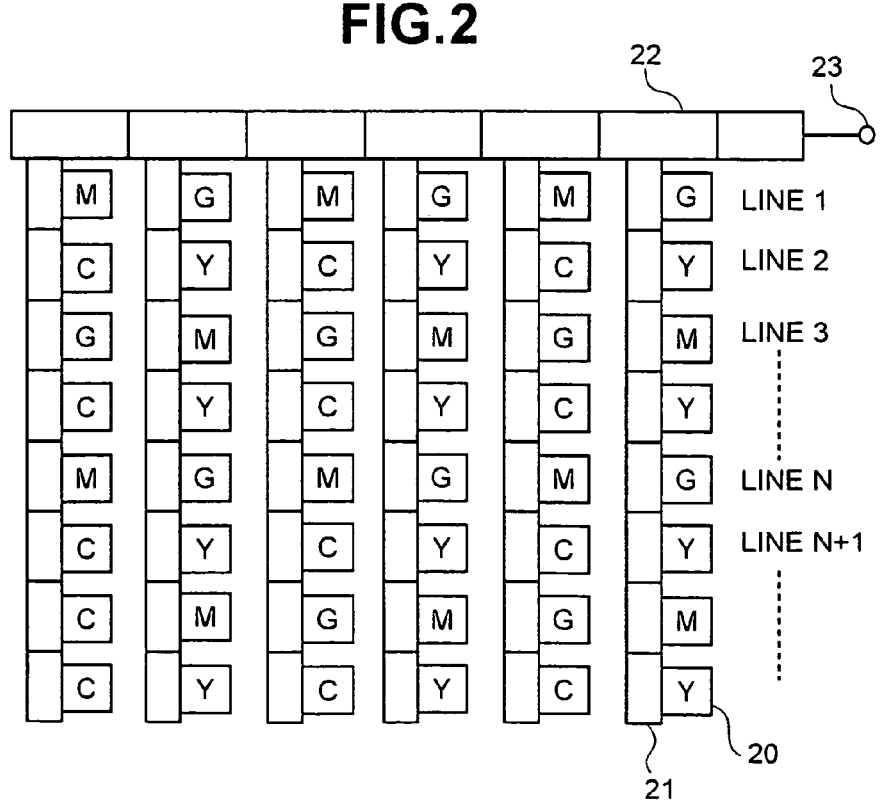
FIG. 2 shows an example of an arrangement of a pickup face of the image sensor shown in FIG. 1.

FIG. 2 shows an example of a constitution on the image pickup face of image sensor 2 in FIG. 1. As shown in FIG. 2, the image sensor 2 prepares many pixels 20 in the pickup face, and pixel signals generated by photoelectric conversion in each pixel 20 are transmitted to a vertical transfer part (vertical CCDs) 21. Transfer operations from pixels 20 to vertical CCDs 21 are normally done simultaneously in all pixels. The pixel signals transferred to the vertical CCDs 21 are transferred to upside on the drawing in the vertical CCDs 21, and transferred in horizontal CCDs 22, and output from an output terminal 23.

The image sensor 2 has a constitution that allows reading signals according to a mixing read mode and a non-mixing read mode. The mixing read mode is an operation mode for generating a motion image, and for example the signals are read out as follows. First, the pixel signal corresponding to the pixels of odd number lines 1, 3, and 5 . . . in horizontal arrays of the pixels in the pickup face are read to the vertical CCDs 21. Next, the pixel signal corresponding to the pixels of even number lines 2, 4, and 6 . . . are read to the vertical CCDs 21. After that, the pixel signals of the even number lines are transmitted to one step up vertically, and mixed with the pixel signals of the odd number lines already read to vertical CCDs 21 in the manner of mixing lines 1 and 2, lines 3 and 4, lines 5 and 6 . . . . And then, mixed pixel signals constituting one line, which is generated by mixing these two lines, are read by transmitting the pixel signals of the vertical CCDs 21 by one step per one horizontal retrace line. For example, in case the number of the effectiveness pixels of a vertical direction is 960, the signals in 480 lines are read as an image of one frame per 1/30 seconds.

In the pixel arrangement of the image sensor shown in FIG. 2 have a color filter array that repeats basic units having eight pixels of horizontally two pixels×vertically four pixels. The image sensor has four types of the color filters; M (Magenta), G (green), CY (cyanogen) and YE (yellow), and the line non-interlaced signal are gained by the mixed signals of these signals. That is, two types of lines, the lines where the point sequential signal repeats (M+C) signals and (G+Y) signals at every pixel, and the other lines where the point sequential signal repeats (G+C) signals and (M+Y) signals at every pixel, are repeated alternately.

Such line sequential signals are also output when taking a motion picture by the video camera. The different point is that pixels are read out by quasi interlace scanning in which all pixels are read in 1/60 second per one field and a combination of lines to be mixed are shifted on the next field, because the number of pixels of an image sensor is generally matched to the number of pixels of a television system in case of an ordinary video cameras. However, in this example of the invention, the combination of the lines to be mixed does not change in every reading.

These four kinds of mixed pixel signals output from the image sensor 2 are supplied to an A/D converter 3, and the A/D converter 3 converts the signals to digital signals. After that, the digital signals are supplied to a signal processor 5. The signal processor 5 converts the output signal of the image sensor 2 into the YUV signals and generates the standard TV signals such as the NTSC system and the PAL system. That is, the signal processor 5 generates the three elementary color signals R (red), G (green) and B (blue) by matrix operations of the four kinds of mixed pixel signals (M+C), (G+Y), (G+C) and (M+Y) and applies white balance processing and gamma processing to the elementary color signals. And further, the signal processor 5 generates the luminance signal Y and color difference signals U and V from the processed elementary color signals, and generates a standard video signal such as the NTSC system and the PAL system by converting the YUV signals to an interlace signal of 60 fields per seconds with a rate converter 11. Thus, the motion picture signal is generated, and the generated motion image is output from output terminal 12. A high quality motion image without the aliasings can be reproduced with the motion picture signal formed by the above way because the signals are not subsampled in the vertical direction.

In case of picking up a still image, the processing is different from the case of picking up a motion image; one line is made form one line without mixing pixels. The signal for interlace is output by reading all data of the lines with odd numbers on the first field to the independence and reading all data of the lines with even numbers on the second field. In case the effective pixel in the vertical is 960, one field period is usually equivalent in 1/30 seconds. This still image signal is supplied to a signal processor 5 through the A/D converter 3 and processed therein like the case of generating the motion image. And also the non-interlace signal, which consists of the alternate lines of the first fields and the alternate lines of the second fields, is generated by using an interlace/non-interlace converter 4. The interlace/non-interlace converter 4 is a memory such as a DRAM and the interlace/non-interlace conversion is done as follows. Signals of odd number lines read out from the image sensor is once written on the memory as odd number lines 1, 3, 5 . . . on the first fields, and signals of even number lines read out from the image sensor is once written on the memory as even number lines 3, 4, 6 . . . on the first fields. After that, the signals on the memory is sequentially read out as the order of line 1, line 2, line 3 . . . .

The still image, which has been processed and sequentially converted in the signal processor 5, is compressed and coded by compressing/decompressing circuit 10 with a system such as JPEG (Joint Photographic Expert Group). The compressed and coded still image data is recorded on a recording media 9 under control of a controller 6.

The recording media 9 is made of a semiconductor memory such as a flash memory, or a magnetic disc device such as a hard disc, etc. The media may be a medium that can be attached and removed such as a PC card. The processed data is output from an output terminal 12. A switch 13 functions as a mode changeover button of the motion image mode and the still image mode, or as a shutter button to trigger the pickup of a still image. The controller 6, which operates different between the motion image pickup and the still image pickup as stated above, controls the operation timing of each block and the input/output operation of the image data in response to an indication from the switch 13.

The compressed and coded still image data, which is recorded in the recording media 9, is decompressed and decoded with the system such as JPEG by compressing/decompressing circuit 10 and processed in the signal processor 5.

While the number of vertical pixels is 960 in the above example, the number of pixels may be other than this. The number of the pixels has only to be almost equal to multiplication by an integer of the effective number of scanning lines in the television signal standard such as NTSC and PAL. While the total number of the scanning lines of NTSC is 525, the effective number of the scanning lines in a scanning range except a vertical blanking range in NTSC is about 485. When ±5% range is permitted, the effective number of scanning lines should be from 460 to 510. In the television signal, the half of the effective number of scanning lines is from 230 to 255 because of interlace scanning. The multiplication of this number is opportune for the number of pixels in the vertical direction on the image sensor. In the above first example, the number of the pixels in the vertical direction on the image sensor is 960. This number is equivalent to 4 times of 240. When the range of four times of 230 to 255 is permitted, the number of the pixels in the vertical direction on the image sensor has only to be in the range from 920 to 1020.

In the above example, the range is four times of from 230 to 255. However, the multiplication by any integer may be used for the number of the pixels on the image sensor. In case of three times for example, the number of the pixels in the vertical direction on the image sensor may be from 690 to 765. In this case, the rate converter 11 converts any readout rate for reading the signals from the image sensor 2 to 60 fields per second according to the standard of the television signal.

Further, the number of the pixels in the vertical direction on the image sensor may be in the range from 920 to 1020. In this case, the motion image signal is generated by extracting the signal of the 690–765 lines from the signal as described above. Also, in this case, the additional coverage pixels, which is not used for generating the motion image, is left over around the image pickup range that is necessary for generating the motion image. These additional coverage pixels may be used for a hand blurring amendment. The details of the hand blurring amendment are described in U.S. Pat. No. 5,502,483 for example.

Figures 3A, 3B, 3C:
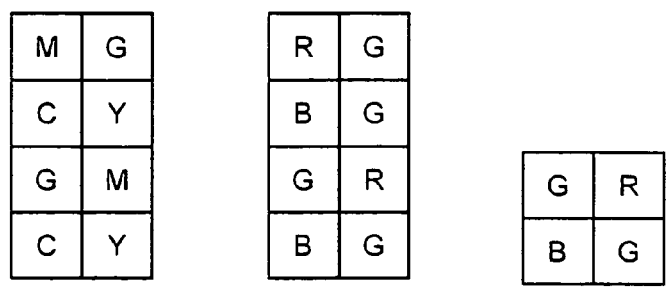
FIG. 3 shows an example of a color filter array of the pickup face of the image sensor shown in FIG. 1.

While the color filter array of the image sensor 2 is the complementary color system as described in FIG. 3A in the above example, it may be the elementary color system using R, G and B filters as described in FIG. 3B. The second example of the invention using the elementary color system is described below. The whole constitution of this example is the same as described in FIG. 1.

In the second example, The signal read by mixing the pixel signals comprises two kinds of lines appearing alternately. The point sequential signal repeats the (R+B) signal and the (G+G) signal alternately for every pixel in the first line. The point sequential signal repeats the (G+B) signal and the (R+G) signal alternately for every pixel in the second line. That is, the non-interlaced signal of magenta pixels and green pixels are output in the first line, the non-interlaced signal of cyanogen pixels and yellow pixels are output in the second line. The three primary colors signals R, G and B are generated by doing a matrix operation on these four kinds of the mixed pixel signals in the signal processor 5.

In this second example, because of the use of the elementary color filter of R, G and B, it is not necessary to generate the elementary color signal from the complementary color signal, and it is easy to reproduce the R, G and B signals by the matrix operation, and it is easy to adjust the color reproducibility. Also, the independent reading, in which two kinds of lines are read alternately, is done when taking a still image. The R and G signals are output alternately on the first kind of lines, and the B and G signals are output alternately on the second kind of lines. Therefore, in the case of generating a still image, the matrix operation to output the R, G and B signals independently from the CCD is unnecessary, and the false signals of colors are hard to generate because no correlative operation by the matrix is done.

Figure 4:
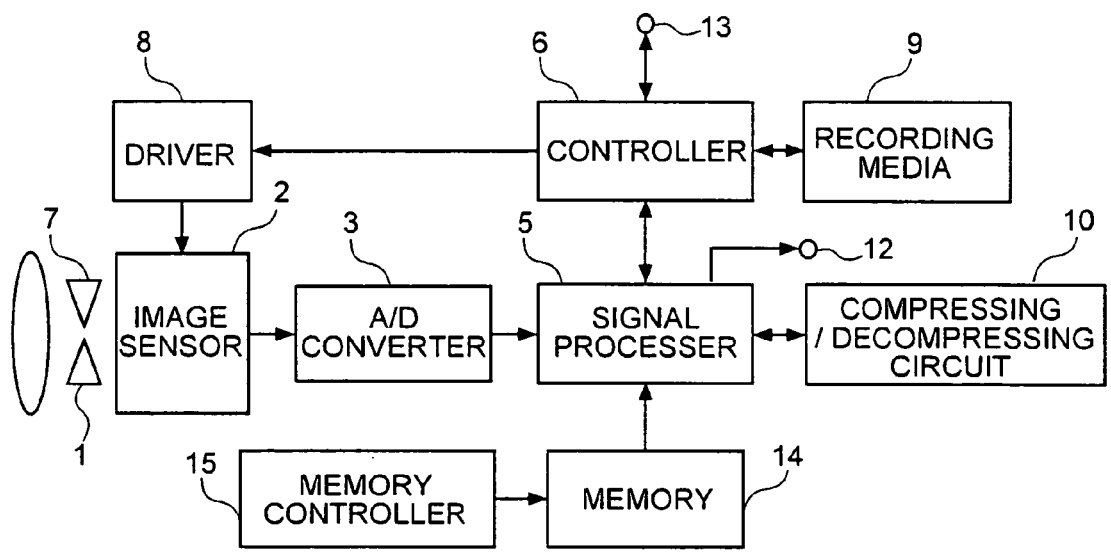
FIG. 4 shows a block diagram of other example of a constitution of an image pickup device according to the present invention.

FIG. 4 shows a block diagram of the third example of the image pickup device according to the present invention. This device has a memory 14 and a memory controller 15, and other blocks appear in FIG. 4 are the same as the blocks having the same numbers in FIG. 1. In this image pickup device, the interlace/non-interlace converter 4 and the rate converter 11 are integrated by using the memory 14 and the memory controller 15. In case of the interlace/non-interlace conversion processing when taking the still image, two fields of the interlace signal, which is created by analog to digital conversion from the output of the image sensor 2, is written in the memory 14, after that the signal in the memory 14 is read out as non-interlaced signal. The memory controller 15 controls the write/read operations of the memory 14.

Also, in case of converting the frame rate, the Y, U and V signals generated by the signal processor 5 are written in the memory 14, and the signals in the memory 14 are read out with the frame rate of 60 fields per seconds. The read out image signal are encoded into the video signal such as the NTSC video signal by the signal processor 5, and the video signal is output from the video output terminal 12. The video signal output from the terminal 12 may be the R, G, and B primary color signal other than the composite video signal.

The fourth example of the image pickup device according to the present invention is explained below.

In the first, second and third examples above, the still image recorded in the recording media 9 is compressed and coded by the compression code system such as JPEG in the compressing/decompressing circuit 10, and the compressed still image read out from the recording media 9 is decompressed and decoded by the compression code system such as JPEG in the compressing/decompressing circuit 10.

Against these examples, the motion image is also compressed and coded by the compressing/decompressing circuit 10 as well as the still image in the fourth example. The constitution is the same as that described in FIG. 1 and FIG. 4. The image compression is done by compression systems such as the MPEG (MOVING PICTURE EXPERT GROUP) system.

In case of the compression by the MPEG 2 system, the Y, U and V signal, which is not applied the interlace conversion before the frame rate conversion, may be used for the input to the compression, and also the signal, which is applied the interlace conversion after the frame rate conversion, may be used. In case that the motion image is compressed by the MPEG system, it is opportune that the number of the pixels of the image sensor 2 is 960 in the vertical and 1440 in the horizontal effective pixel number.

In this example, the motion image of the MPEG2 format, which has the high picture quality, is generated. Both of the interlace mode and non interlace may be adapted to the device in case of the compression by MPEG 2 system.

The fifth example of the image pickup device according to the present invention is explained below. The constitution is the same as that described in FIG. 1 and FIG. 4 also in this case.

In the examples described before, the still image is generated by using the signal read out sequentially from the image sensor 2. In the fifth example, the still image is generated by using the signal read out sequentially after mixing the pixel signals. The number of lines of the still image generated by such manner is half compared with the still image generated by the interlace independent readings. This still image is low resolution but the image is photographed without a shutter mechanism.

Also, it may be used as a freeze function in the motion picture mode. The high-resolution still image of a moving object was not obtained in case of taking the still image from the motion image by the freeze function of conventional image pickup device because the signal is stored at every fields. However, in this example, a high-resolution still image is obtained by the freeze function at any timing of the motion picture. This photograph mode may be used as a sequence photograph mode.

We claim:

1. An image pickup device comprising:
   a photoelectric sensor of interlace type having pixels arranged in the vertical and horizontal directions which converts the light focused on the pixels to electric pixel signals, an effective pixel number of said photo electric sensor in a vertical direction is twice or more than an effective number of scanning lines in a television signal standard, the pixel signals accumulated in each of the pixels are outputted with interlace by subsampling the pixel signals for every one line in a first signal read mode, and a sum of the pixel signals in the two pixels adjoining each other in the vertical direction are sequentially outputted with non-interlace in a second signal read mode, the combination of two pixels adjoining each other in the vertical direction in the second signal read mode are same every time when a sum of the pixel signals are outputted;
   an interlace/non-interlace converter which converts the signals with the interlace, which are output from the photoelectric sensor in the first signal read mode, to a non-interlaced signal;
   a signal processor which generates a first video signal by converting the non-interlaced signal converted by the interlace/non-interlace converter into a specified image format in the first signal read mode, and generating a second video signal by converting the signal output by the photoelectric sensor into the specified image format;
   a rate converter which converts a number of the output images of the second video signal per a unit time into another number which is more than the number of output images before conversion, from a non-interlaced scan into an interlaced scan, and converts a number of lines of the output images of the second video signal into another number which is less than the number of lines before the conversion and which is approximately equal to the number of lines of a field displayed on a monitor, wherein the monitor displays plural fields with interlace;
   an encoder which generates a first or second image data by compressing the first or second video signals output from the signal processor;
   a memory device which memorizes the first or second image data output from the encoder; and
   a decoder which reproduces the first video signal by decoding the first image data memorized in the memory device.

2. The image pickup device of claim 1, wherein said interlace/non-interlace converter and said rate converter comprise a memory that stores said signals output from the photoelectric sensor, and a memory controller that controls writing and reading addresses and timings.

3. The image pickup device of claim 1, wherein said first video signal is a still image signal representing one still image, and said second video signal is a motion image signal having a plurality of continuous images of a motion picture.

4. The image pickup device of claim 1, wherein said first and second image data are still image data each representing one still image.

5. The image pickup device of claim 1, wherein said arrangement of said pixels on said photoelectric sensor has a cycle of units of two rows in the vertical direction and four lines in the horizontal direction, the pixels of the first color and the pixels of the second color are arranged alternately in the first lines, the pixels of the third color and the pixels of the fourth color are arranged alternately in the second lines, the pixels of the second color and the pixels of the first color are arranged alternately in the third lines, and the pixels of the third color and the pixels of the fourth color are arranged alternately in the fourth lines.

6. The image pickup device of claim 5, wherein said first color is magenta, said second color is green, said third color is cyan, and said fourth color is yellow.

7. The image pickup device of claim 5, wherein said first color is red, said second color is green, said third color is blue, and said fourth color is green.

8. The image pickup device of claim 5, wherein an effective pixel number of said photoelectric sensor in a vertical direction approximates multiplication by an integer of an effective number of scanning lines in a television signal standard.

9. The image pickup device of claim 8, wherein said effective pixel number of said photoelectric sensor is from 920 to 1020.

10. An image pickup device comprising:
    a photoelectric sensor of interlace type having pixels arranged in vertical and horizontal directions which converts the light focused on the pixels to electric pixel signals, an effective pixel number of said photo electric sensor in a vertical direction is twice or more than an effective number of scanning lines in a television signal standard, the pixel signals accumulated in each pixels are outputted with interlace by subsampling the pixel signals for every one line in a first signal read mode, and a sum of the pixel signals in the two pixels adjoining each other in the vertical direction are sequentially outputted with non-interlace in a second signal read mode, the combination of two pixels adjoining each other in the vertical direction in the second signal read mode are same every time when a sum of the pixel signals are outputted;

an interlace/non-interlace converter which converts the signals with the interlace, which are output from the photoelectric sensor in the first signal read mode, to a non-interlaced signal;

a signal processor which generates a first video signal by converting the non-interlaced signal converted by the interlace/non-interlace converter into a specified image format in the first signal read mode, and generating a second video signal by converting the signal output by the photoelectric sensor into the specified image format;

a rate converter which converts a number of the output images of the second video signal per a unit time into another number which is more than the number of the output images before conversion, from a non-interlaced scan into an interlaced scan, and coverts a number of lines of the output images of the second video signal into another number which is less than the number of lines before conversion and which is approximately equal to the number of lines of a field displayed on a monitor, in which the monitor displays plural fields with interlace;

an encoder which generates a first or second image data by compressing data volume in frames of the first or second video signals output from the signal processor by a first compressing method, and that generates a third image data by compressing data volume in frames of the second video signals output from the signal processor by a second compressing method;

a memory device which memorizes the first or second image data and the third image data that are output from the encoder; and a decoder which reproduces the first or second video signal and a third video signal by decoding the first or second image data and the third image data that are memorized in the memory device.

11. The image pickup device of claim 10, wherein said interlace/non-interlace converter and said rate converter comprise a memory for storing said signals output from the photoelectric sensor, and a memory controller that controls writing and reading addresses and timings.

12. The image pickup device of claim 10, wherein said first video signal is a still image signal representing one still image, and said second video signal is a motion image signal having a plurality of continuous images of a motion picture.

13. The image pickup device of claim 12, wherein an effective pixel number of said photoelectric sensor in a vertical direction which generates the motion picture approximates multiplication by an integer of the effective number of scanning lines in the television signal standard.

14. The image pickup device of claim 10, wherein said first and second image data are still image data each representing one still image, and said third image data is motion image data representing a plurality of continuous images of a motion picture.

15. The image pickup device of claim 10, wherein said arrangement of said pixels on said photoelectric sensor has a cycle of units of two rows in the vertical direction and four lines in the horizontal direction, the pixels of the first color and the pixels of the second color are arranged alternately in the first lines, the pixels of the third color and the pixels of the fourth color are arranged alternately in the second lines, the pixels of the second color and the pixels of the first color are arranged alternately in the third lines, and the pixels of the third color and the pixels of the fourth color are arranged alternately in the fourth lines.

16. The image pickup device of claim 15, wherein said first color is magenta, said second color is green, said third color is cyan, and said fourth color is yellow.

17. The image pickup device of claim 15, wherein said first color is red, said second color is green, said third color is blue, and said fourth color is green.

18. The image pickup device of claim 11, wherein said effective pixel number of said photoelectric sensor is from 920 to 1020.

* * * * *